US008971058B2

(12) United States Patent
Pan et al.

(10) Patent No.: US 8,971,058 B2
(45) Date of Patent: Mar. 3, 2015

(54) HIGH-EFFICIENCY HIGH STEP-UP RATIO DIRECT CURRENT CONVERTER WITH INTERLEAVED SOFT-SWITCHING MECHANISM

(75) Inventors: Ching-Tsai Pan, Taipei (TW); Ming-Chieh Cheng, Taipei (TW); Ching-Ming Lai, Taipei (TW); Yen-Liang Chou, Taipei (TW); Chih-Hsing Fang, Taipei (TW); Wen-Wei Chan, Taipei (TW)

(73) Assignee: Allis Electric Co., Ltd., Taipei (TW)

( * ) Notice: Subject to any disclaimer, the term of this patent is extended or adjusted under 35 U.S.C. 154(b) by 303 days.

(21) Appl. No.: 13/592,423

(22) Filed: Aug. 23, 2012

(65) Prior Publication Data

US 2014/0056032 A1    Feb. 27, 2014

(51) Int. Cl.
*H02M 3/335* (2006.01)

(52) U.S. Cl.
USPC .................. 363/21.01; 363/21.04; 363/68

(58) Field of Classification Search
USPC ........ 363/16, 20, 21.01, 21.04, 24–26, 65, 68
See application file for complete search history.

(56) References Cited

U.S. PATENT DOCUMENTS

| 4,618,919 A * | 10/1986 | Martin, Jr. ................ 363/21.12 |
| 5,088,017 A * | 2/1992 | Yaginuma et al. ......... 363/21.04 |
| 5,508,903 A * | 4/1996 | Alexndrov .................... 363/16 |
| 5,796,595 A * | 8/1998 | Cross ............................ 363/71 |
| 6,917,527 B2 * | 7/2005 | Takada ......................... 363/16 |
| 7,623,363 B2 * | 11/2009 | Nakanishi .................... 363/65 |
| 8,081,492 B2 * | 12/2011 | Nakahori ...................... 363/16 |

* cited by examiner

*Primary Examiner* — Fred E Finch, III

(57) ABSTRACT

A high-efficiency high step-up ratio direct current converter with an interleaved soft-switching mechanism is provided. The direct current converter includes a voltage-multiplier circuit and an active clamping circuit. The voltage-multiplier circuit includes two isolating transformers, two main switches disposed on a primary side of the two isolating transformers, four diodes disposed on a secondary side of the two isolating transformers and four capacitors disposed on the secondary side of two isolating transformers, configured to boost a voltage of a direct-current power to a desired voltage value. The active clamping circuit, electrically connected to the voltage-multiplier circuit, includes two active clamp switches and a clamp capacitor to lower a voltage surge of the two main switches so that the two main switches and the two active clamp switches can be soft switched on.

3 Claims, 19 Drawing Sheets

US 8,971,058 B2

HIGH-EFFICIENCY HIGH STEP-UP RATIO DIRECT CURRENT CONVERTER WITH INTERLEAVED SOFT-SWITCHING MECHANISM

BACKGROUND OF THE INVENTION

1. Field of the Invention

The invention relates to a high-efficiency high step-up ratio direct current converter with an interleaved soft-switching mechanism.

2. Description of the Related Art

It can be said that modern high technology civilization is developed on a base of massive consumption of petrochemical energies. According to the researches and statistics, however, the petrochemical energy will be gradually consumed, and the storage amount of global petroleum fuel could afford us for use less than forty years. When the petrochemical energy is utilized to improve quality of life, a large amount of greenhouse gases are simultaneously produced, resulting in greenhouse effect and damages of nature ecological environment. In view of increasing price of petroleum every day, many countries in the world begin to promote energy saving and carbon reduction. Also, clean renewable energies such as solar energy, wind power and fuel cell are gradually valued, and thus energy technologies connected therewith are gradually applied and developed.

It is difficult to build a large renewable energy generation system on an island with small area but densely populated due to space limitation, and therefore a small distributed electric power system is gradually valued. A small renewable energy can be composed of electric power conversion circuits such as a solar photovoltaic module or fuel cell, a step-up DC/DC converter, a DC/AC converter, etc. In general, a solar or fuel cell supplies a low voltage DC power (20V-45V). However, a post-stage DC/AC converter requires a higher DC input voltage (350V-400V) for conversion into a commonly-used AC (110Vrms, 220Vrms), thereby supplying to a load or parallel operation with the utility. Therefore, it is essential to use a high step-up ratio DC/DC converter to attain a front-stage step-up purpose. However, due to a large current input of such a high step-up ratio DC/DC converter, larger current ripple and flip-flop switching loss are easily occurred therewith.

BRIEF SUMMARY OF THE INVENTION

In view of this, the invention provides a high step-up ratio direct current/direct current converter with an interleaved switching technique and a switch soft-switching technique, thereby promoting efficiency of the converter. Besides, the converter of the invention is characterized with wide-range input/output voltage and modularization, considerably suitable for applying to a future distributed renewable power system.

The invention provides a high-efficiency high step-up ratio direct current converter with an interleaved soft-switching mechanism. The direct current converter includes a voltage-multiplier circuit and an active clamping circuit. The voltage-multiplier circuit includes two isolating transformers, two main switches disposed on a primary side of the two isolating transformers, four diodes disposed on a secondary side of the two isolating transformers and four capacitors disposed on the secondary side of two isolating transformers, configured to boost a voltage of a direct-current power to a desired voltage value. The active clamping circuit, electrically connected to the voltage-multiplier circuit, includes two active clamp switches and a clamp capacitor to lower a voltage surge of the two main switches so that the two main switches and the two active clamp switches can be soft switched on.

In one aspect of the invention, the two main switches are configured to be in interleaved switching operation, the two active clamp switches are configured to be in interleaved switching operation, and the two main switches and the two active clamp switches are configured to be in complementary switching operation.

In another aspect of the invention, the two main switches and the two active clamp switches are soft switched with dead time provided therebetween.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
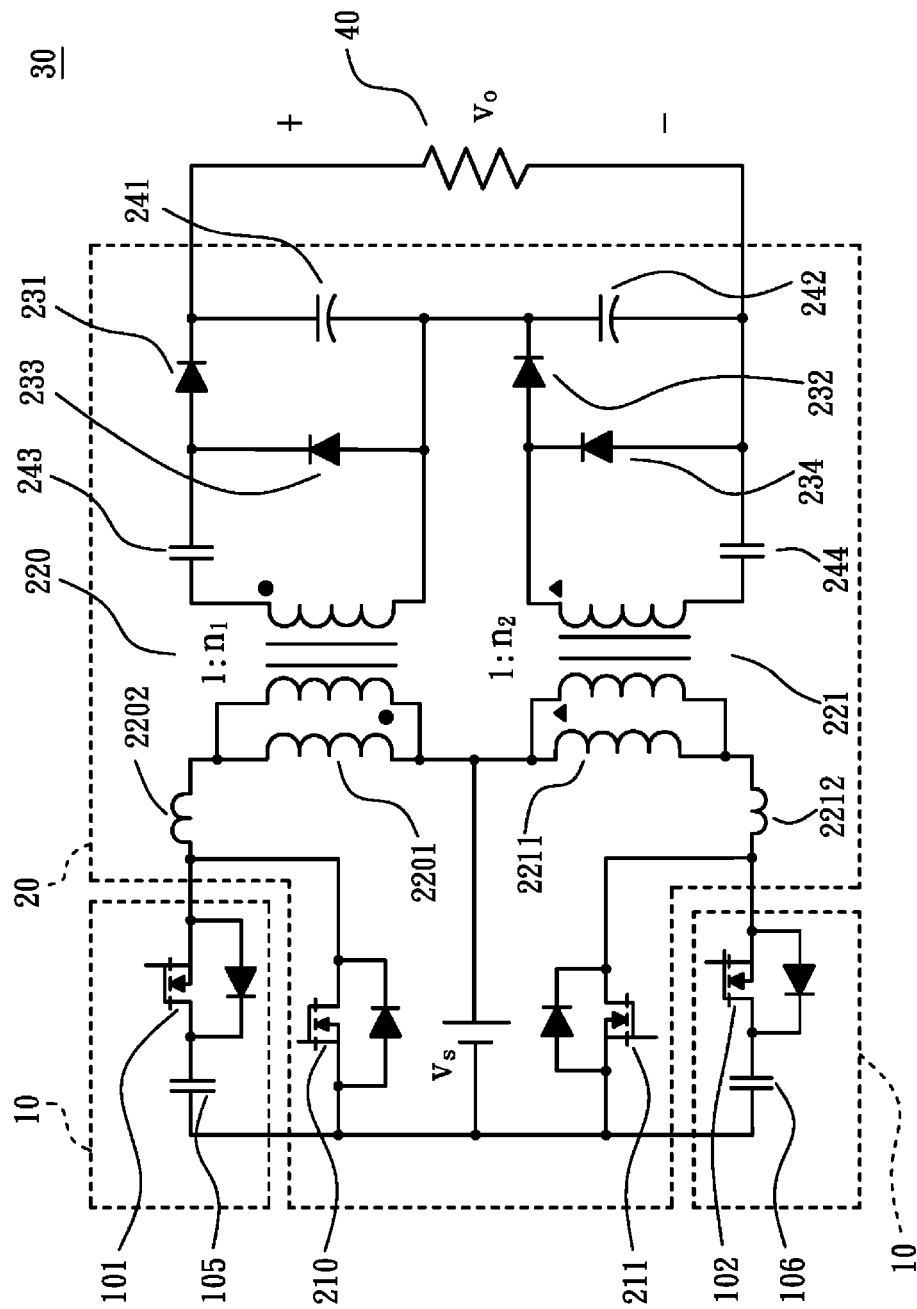
FIG. 1 is a circuit diagram of a first embodiment of a high-efficiency high step-up ratio direct current converter with an interleaved soft-switching mechanism of the invention.

FIG. 1 is a circuit diagram of a first embodiment of a high-efficiency high step-up ratio direct current converter 30 with an interleaved soft-switching mechanism of the invention, in which the direct current converter 30 comprises an active clamping circuit 10 and a voltage-multiplier circuit 20. The voltage-multiplier circuit 20 comprises two isolating transformers 220 and 221, two main switches 210 and 211 disposed on a primary side of the two isolating transformers 220 and 221, four diodes 231, 232, 233 and 234 disposed on a secondary side of the two isolating transformers 220 and 221, and four capacitors 241, 242, 243 and 244. The isolating transformer 220 comprises an excitation inductance 2201 and a leakage inductance 2202, and the isolating transformer 221 comprises an excitation inductance 2211 and a leakage inductance 2212. The voltage-multiplier circuit 20 is characterized with high voltage conversion ratio, capable of reducing conduction loss and facilitating to increase efficiency. The active clamping circuit 10 electrically connected to the voltage-multiplier circuit 20 comprises two active clamp switches 101 and 102 and two clamp capacitors 105 and 106. The active clamping circuit 10 is configured to attain main purposes, including to lower a voltage surge of the two main switches 210 and 211 so that the two main switches 210 and 211 and the two active clamp switches 101 and 102 are capable of attaining a soft-switching property of zero voltage switching (ZVS) when the two main switches 210 and 211 and the two active clamp switches 101 and 102 are switched on, and further to increase power conversion efficiency of integral circuit. An output terminal of the direct current converter 30 of the invention is capable of connecting to a load or post-stage converter.

Figure 2:
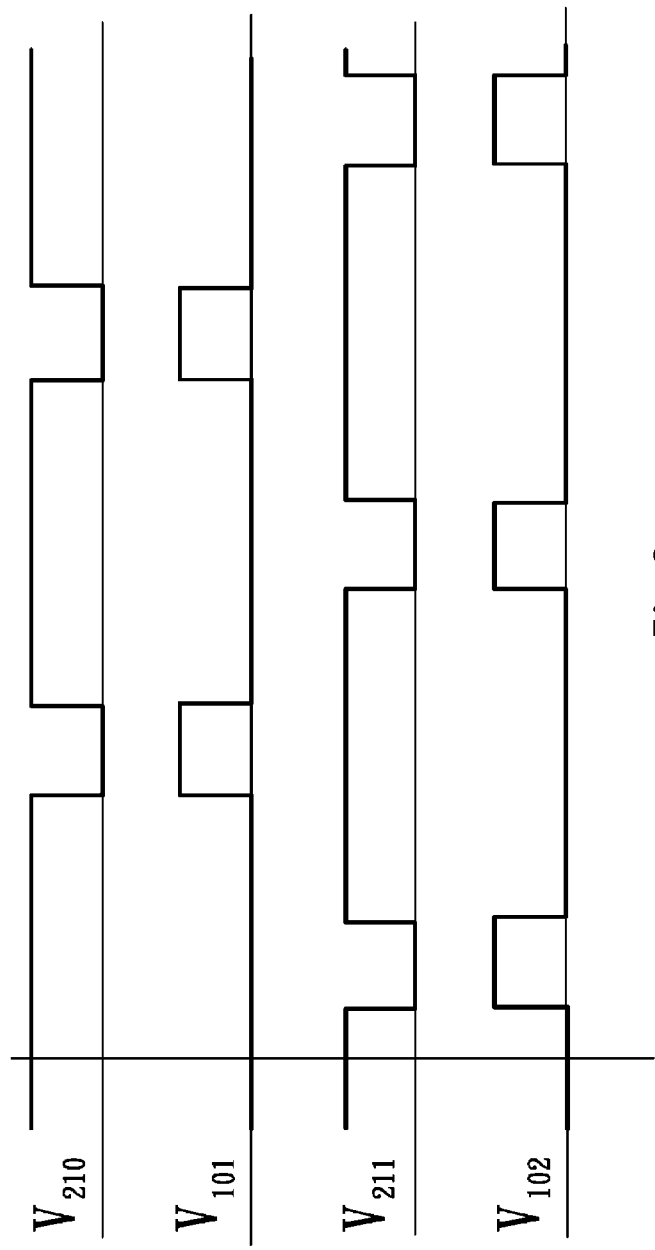
FIG. 2 shows a fundamental principle followed by a switching operation of main switches and active clamp switches of the invention.
Figure 3:
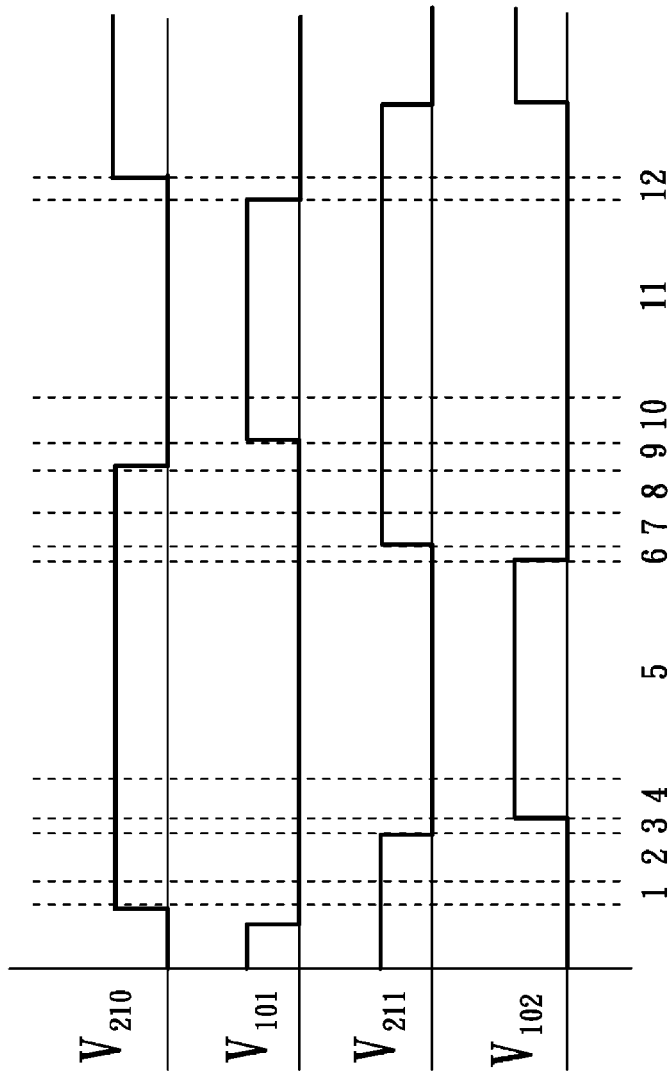
FIG. 3 shows the switching operation in twelve working modes of the main switches and active clamp switches of the invention.

FIG. 2 shows a fundamental principle followed by a switching operation of the main switches 210 and 211 and the active clamp switches 101 and 102. The interleaved switching operation of the main switches 210 and 211 (with difference of a half switching cycle, i.e., phase difference of 180 degrees) are illustrated in FIG. 2, in which $V_{210}$ and $V_{211}$ represent driving voltages of the main switches 210 and 211, respectively. The complementary switching operation of the active clamp switches 101 and 102 are illustrated in FIG. 2, in which $V_{101}$ and $V_{102}$ represent driving voltages of the active clamp switches 101 and 102, respectively. In order to prevent the occurrence of short on the primary-side clamp capacitors 105 and 106, it is required to provide dead time between the operations of the main switches 210 and 211 and the active clamp switches 101 and 102 as shown in FIG. 3. With an operation cycle divided into twelve intervals, the working modes of the direct current converter 30 will be described in details hereinafter.

Figure 4:
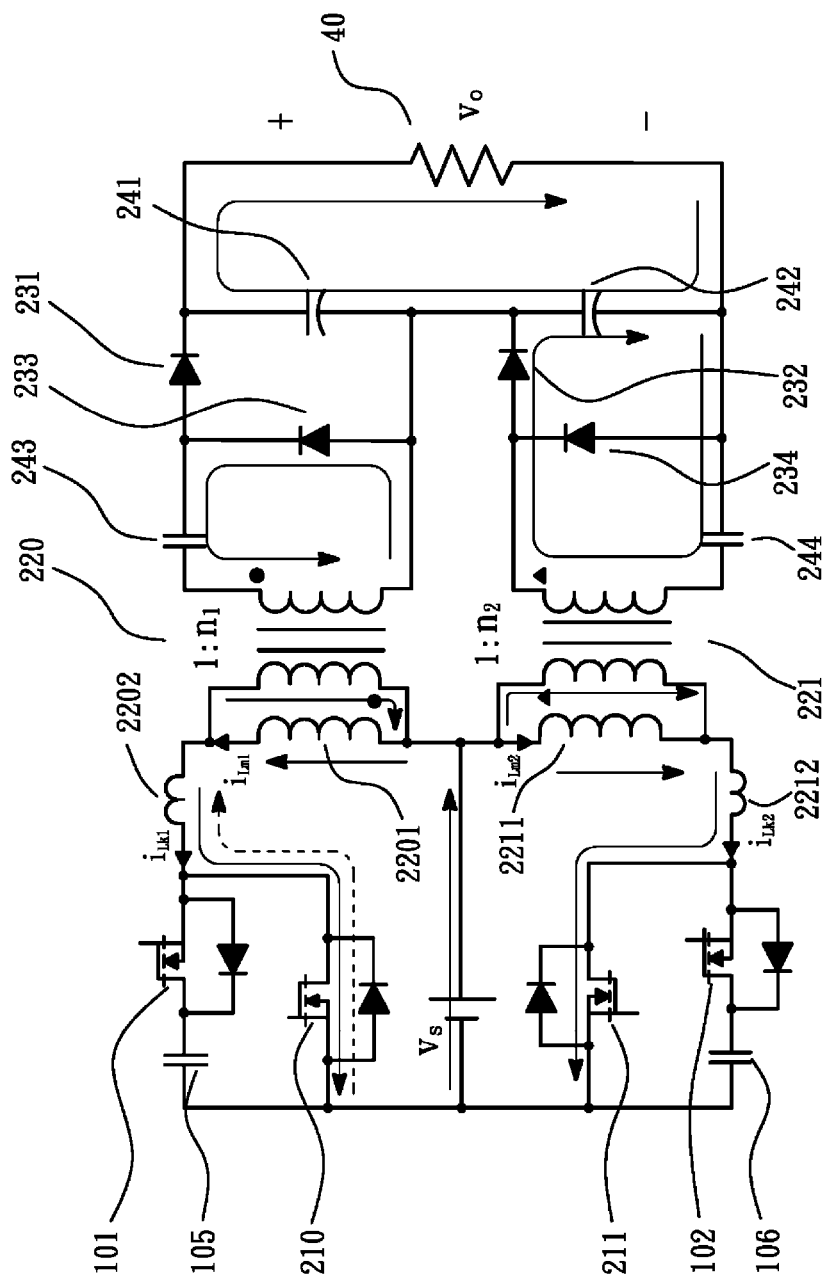
FIG. 4 shows an equivalent circuit in a first working mode in accordance with a first embodiment of a direct current converter of the invention.

FIG. 4 shows an equivalent circuit of the direct current converter 30 in a first working mode, in which the main switches 210 and 211 are switched on, the active clamp switches 101 and 102 are switched off, the diodes 233 and 232 are switched on, and the diodes 231 and 234 are switched off. Because the current advancedly flows through an equivalent body diode (not shown in FIGs.) of the main switch 210 in a previous working mode (a twelfth mode), the main switch 210 in the first working mode is able to be zero-voltage switched on. A primary-side input current of the isolating transformer 220 flows out from the dot, and a secondary-side current of the isolating transformer 220 flows in the dot for storing energy to the capacitor 243 when flowing through the diode 233. The capacitor 241 releases energy from the load 40. A primary-side input current of the isolating transformer 221 flows in the dot, and a secondary-side current of the isolating transformer 221 flows out from the dot for releasing energy from the capacitor 242 and the load 40 when flowing through the diode 232 and the capacitor 242. With respect to current directions illustrated in FIG. 4, a dashed line represents a current direction when the first working mode is started, and a solid line represents a current direction when the first working mode is ended. In FIG. 4, it can be appreciated that the current $i_{Lk1}$ flowing through the leakage inductance 2202 is changed from a negative current to a positive current in the first working mode. When the current $i_{Lk1}$ flowing through the leakage inductance 2202 is equal to a current $i_{Lm1}$ flowing through the excitation inductance 2201, the primary-side current of the isolating transformers 220 begins to flow in the dot, and a second working mode is started.

Figure 5:
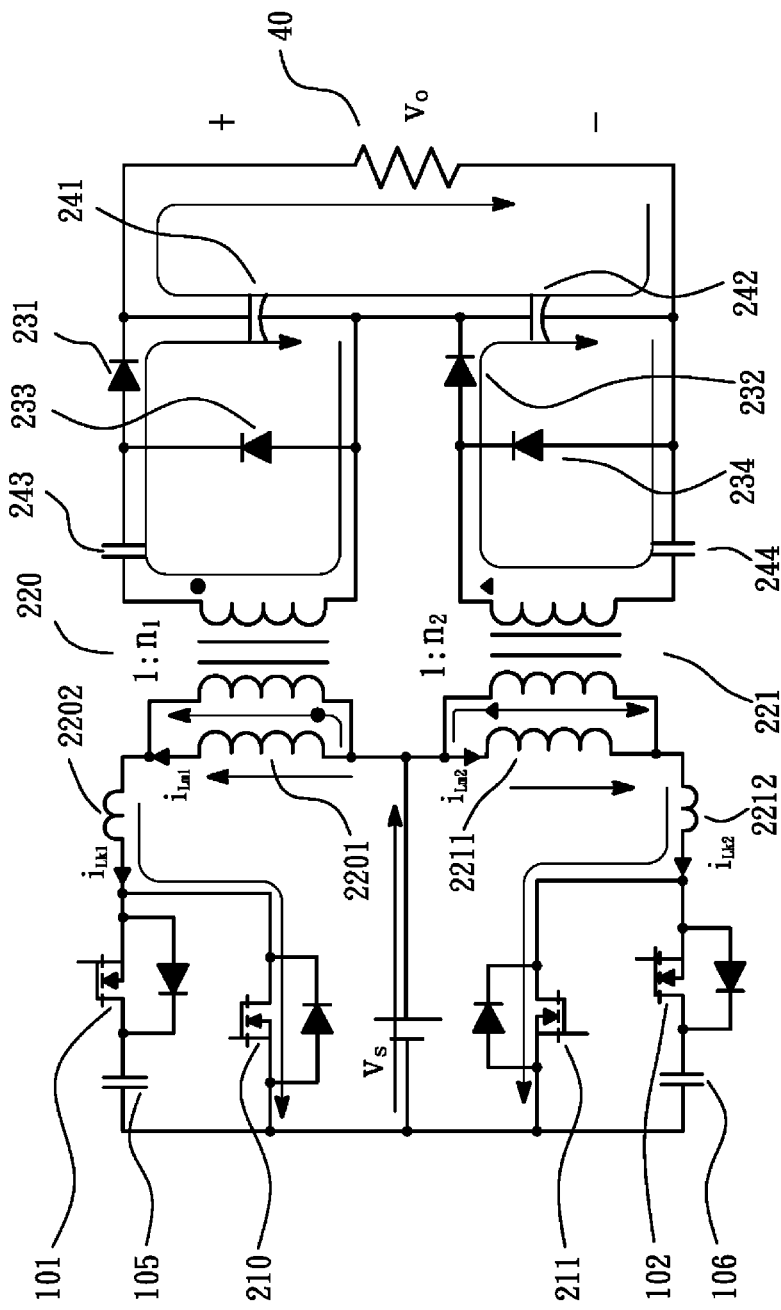
FIG. 5 shows an equivalent circuit in a second working mode in accordance with a first embodiment of a direct current converter of the invention.

FIG. 5 shows an equivalent circuit of the direct current converter 30 in the second working mode, in which the main switches 210 and 211 are switched on, the active clamp switches 101 and 102 are switched off, the diodes 231 and 232 are switched on, and the diodes 233 and 234 are switched off. The primary-side current of each of the isolating transformers 220 and 221 flows in the dot, and the secondary-side current of each of the isolating transformers 220 and 221 flows out from the dot for releasing energy from the capacitor 242 and the load 40 when flowing through the diodes 231 and 232 and the capacitors 243 and 244, respectively. As shown in FIG. 3, when the main switch 211 is switched off in the second working mode, a third working mode is started.

Figure 6:
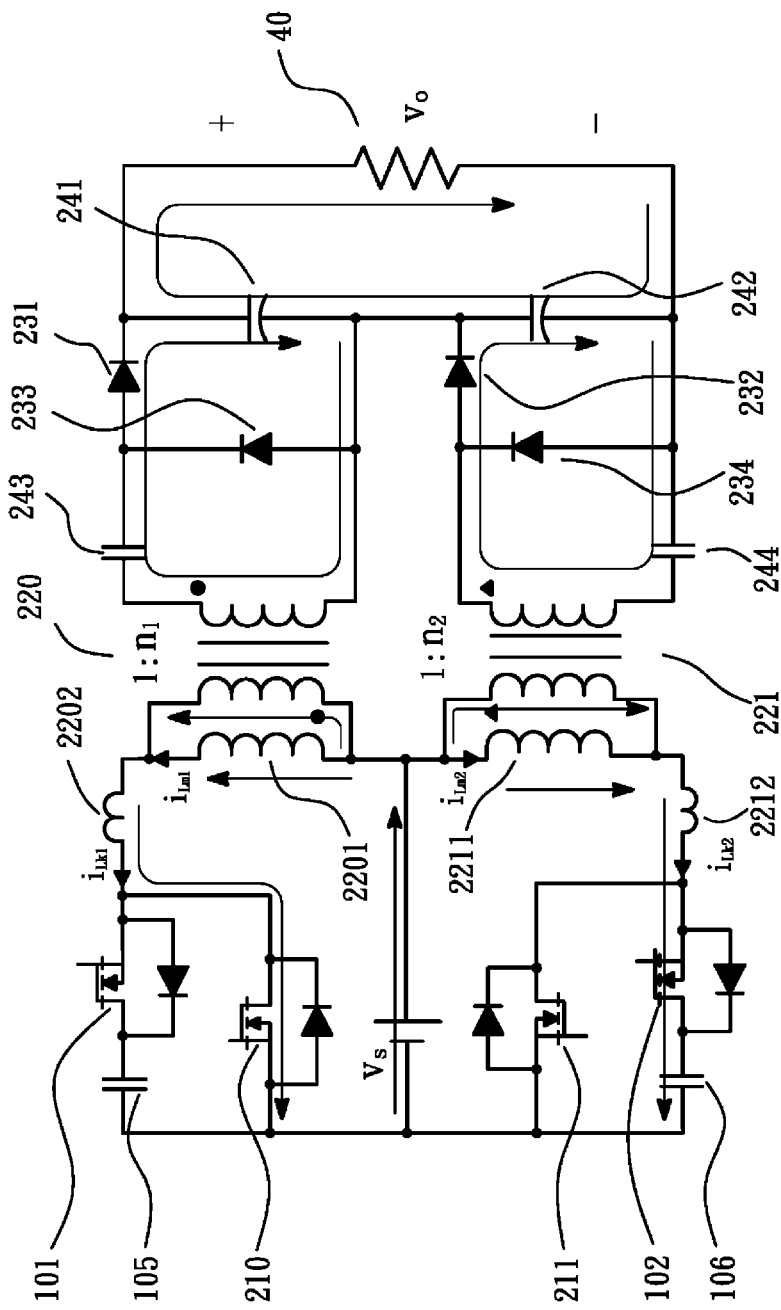
FIG. 6 shows an equivalent circuit in a third working mode in accordance with a first embodiment of a direct current converter of the invention.

FIG. 6 shows an equivalent circuit of the direct current converter 30 in the third working mode, in which the main switch 210 is switched on, the main switch 211 and the active clamp switches 101 and 102 are switched off, the diodes 231 and 232 are switched on, the diodes 233 and 234 are switched off, and at this moment the switches 210, 211, 101, and 102 are situated at the dead time. The primary-side currents of each of the isolating transformers 220 and 221 flows in the dot, and a secondary-side current of the isolating transformers 220 and 221 flows out from the dot for releasing energy from the capacitor 241 and 242 and the load 40 when flowing through the diodes 231 and 232 and the capacitors 243 and 244. Due to the continuous flow of the current $i_{Lk1}$ of the leakage inductance 2212, the equivalent body diode of the active clamp switch 102 is switched on, and the current advancedly flows through the equivalent body diode of the active clamp switch 102. Thus, the active clamp switch 102 is able to be zero-voltage switched on at the beginning of the fourth working mode. As shown in FIG. 3, when the active clamp switch 102 is switched on in the third working mode, a fourth working mode is started.

Figure 7:
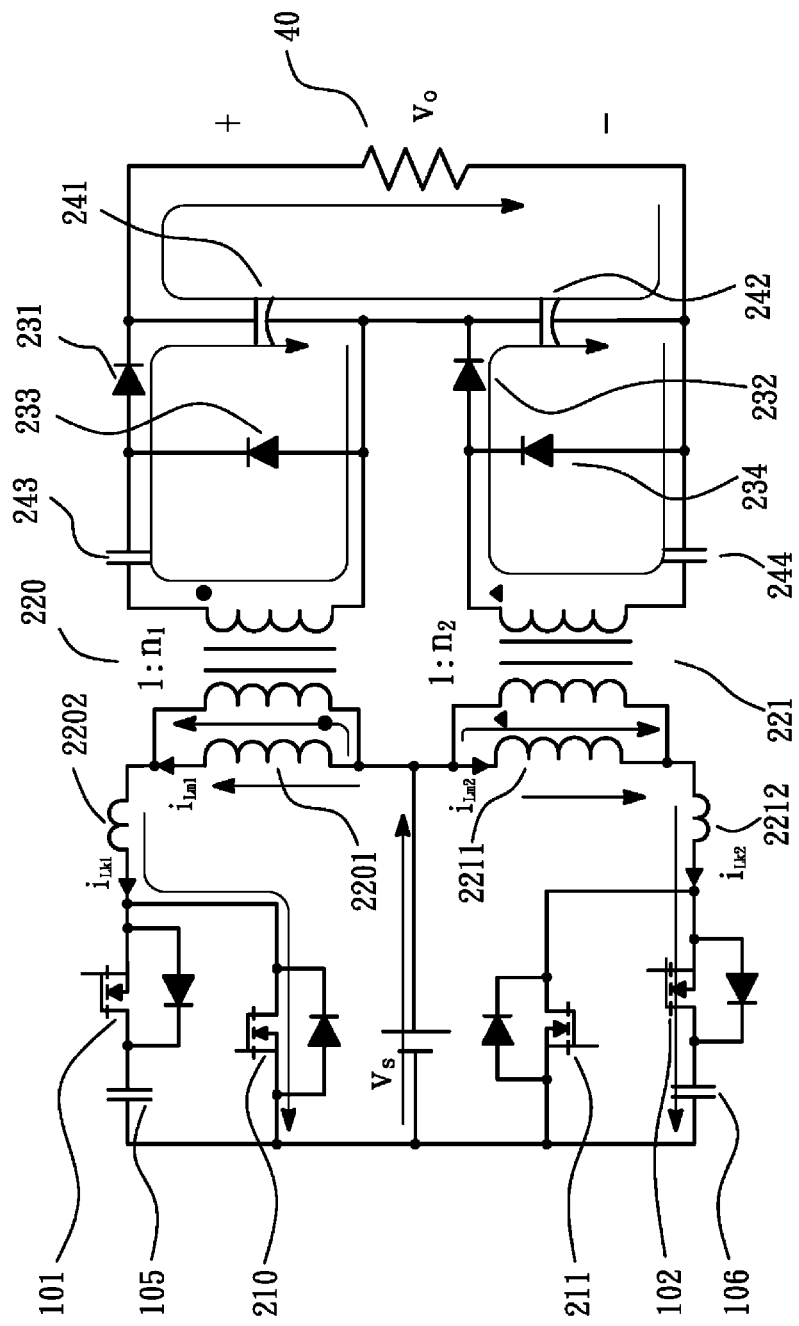
FIG. 7 shows an equivalent circuit in a fourth working mode in accordance with a first embodiment of a direct current converter of the invention.

FIG. 7 shows an equivalent circuit of the direct current converter 30 in the fourth working mode, in which the main switch 210 and the active clamp switch 102 are switched on, the main switch 211 and the active clamp switch 101 are switched off, the diodes 231 and 232 are switched on, and the diodes 233 and 234 are switched off. As mentioned above, because the equivalent body diode of the active clamp switch 102 is already switched on in the previous working mode (the third working mode), the active clamp switch 102 is able to be zero-voltage switched on at the beginning of the fourth working mode. The primary-side current of each of the isolating transformers 220 and 221 flows in the dot, and the secondary-side current of each of the isolating transformers 220 and 221 flows out from the dot for releasing energy from the capacitors 241 and 242 and the load 40 when flowing through the diodes 231 and 233 and the capacitors 243 and 244, respectively. When the current $i_{Lk2}$ flowing through the leakage inductance 2212 is equal to a current $i_{Lm2}$ flowing through the excitation inductance 2211 in the fourth working mode, the primary-side current of the isolating transformers 221 begins to flow out from the dot, and a fifth working mode is started.

Figure 8:
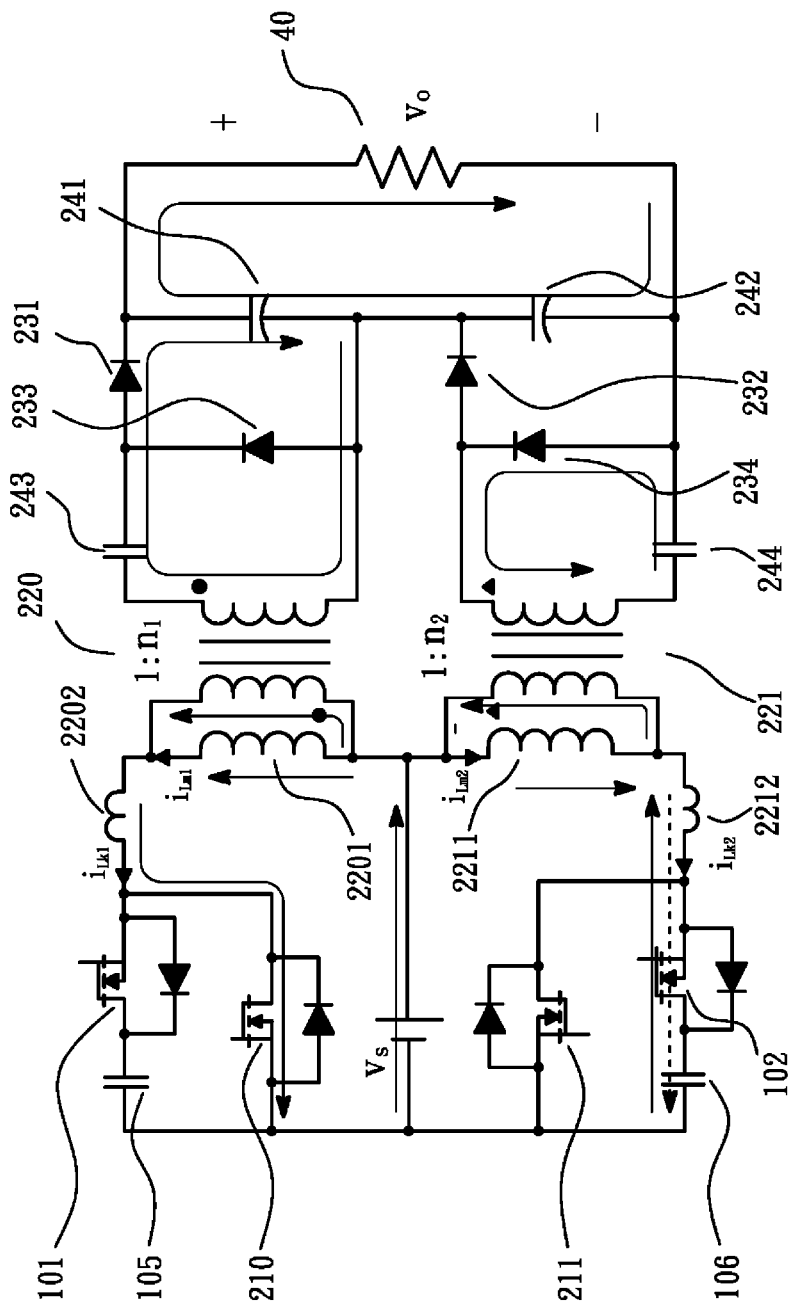
FIG. 8 shows an equivalent circuit in a fifth working mode in accordance with a first embodiment of a direct current converter of the invention.

FIG. 8 shows an equivalent circuit of the direct current converter 30 in the fifth working mode, in which the main switch 210 and the active clamp switch 102 are switched on, the main switch 211 and the active clamp switch 101 are switched off, the diodes 231 and 234 are switched on, and the diodes 233 and 232 are switched off. The primary-side current of the isolating transformer 220 flows in the dot, and the secondary-side current of the isolating transformer 220 flows out from the dot for releasing energy from the capacitor 241 and the load 40 when flowing through the diode 231 and the capacitor 243. The primary-side current of the isolating transformer 221 flows out from the dot, and the secondary-side current of the isolating transformer 221 flows in the dot for storing energy in the capacitor 244 when flowing through the diode 234. The capacitor 243 releases energy from the load 40. With respect to current directions illustrated in FIG. 8, a dashed line represents a current direction when the fifth working mode is started, and a solid line represents a current direction when the fifth working mode is ended. In FIG. 8, it can be appreciated that the current $i_{Lk2}$ flowing through the leakage inductance 2212 is changed from a positive current to a negative current in the fifth working mode. As shown in FIG. 3, when the active clamp switch 102 is switched off in the fifth working mode, a sixth working mode is started.

Figure 9:
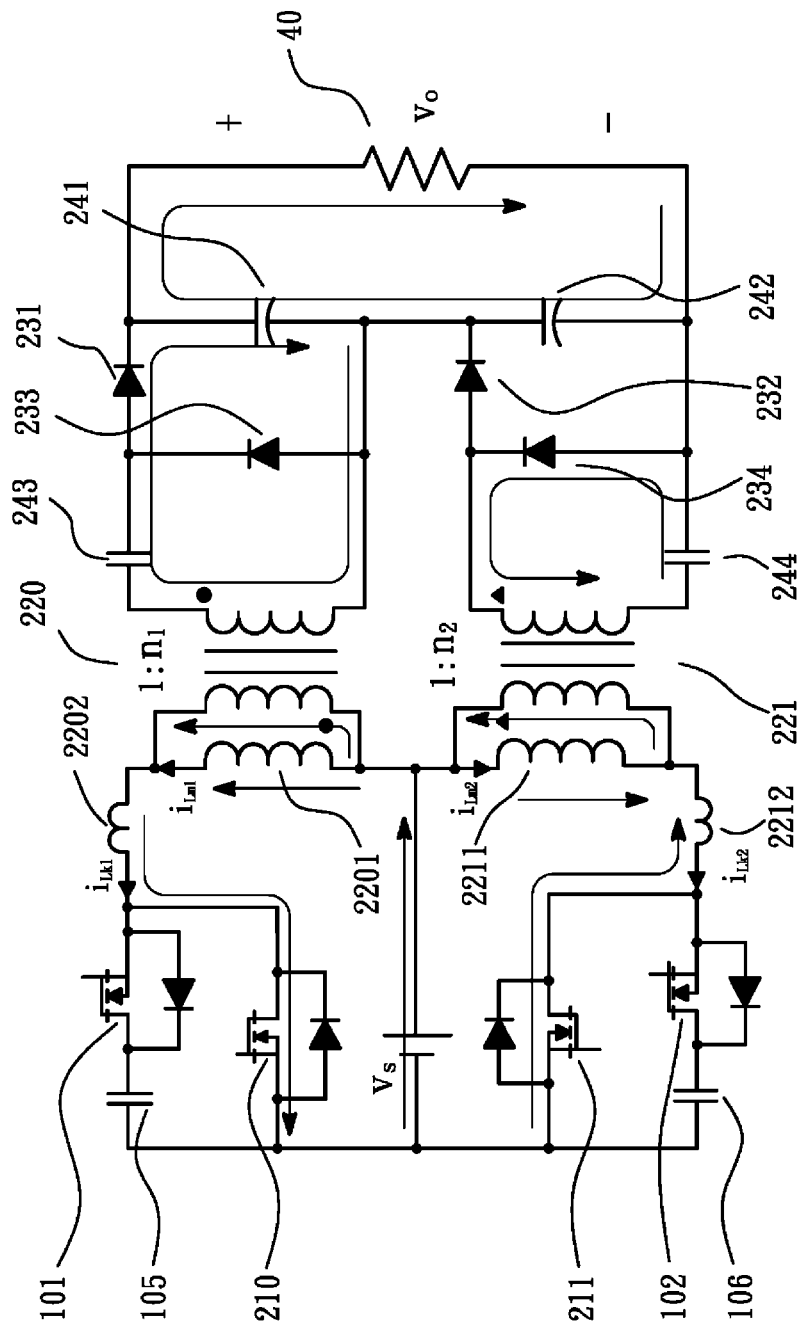
FIG. 9 shows an equivalent circuit in a sixth working mode in accordance with a first embodiment of a direct current converter of the invention.

FIG. 9 shows an equivalent circuit of the direct current converter 30 in the sixth working mode, in which the main switch 210 is switched on, the main switch 211 and the active clamp switches 101 and 102 are switched off, the diodes 231 and 234 are switched on, the diodes 233 and 232 are switched off, and at this moment the switches 210, 211, 101, and 102 are situated at the dead time. The primary-side current of the isolating transformer 220 flows in the dot, and the secondary-side current of the isolating transformer 220 flows out from the dot for releasing energy from the capacitor 241 and the load 40 when flowing through the diode 231 and the capacitor 243. The primary-side current of the isolating transformer 221 flows out from the dot, and the secondary-side current of the isolating transformer 221 flows in the dot for storing energy in the capacitor 244 when flowing through the diode 234. The capacitor 242 releases energy from the load 40. Due to the continuous flow of the current $i_{Lk2}$ of the leakage inductance 2212, the equivalent body diode of the main switch 211 to be switched on, and the current of the main switch 211 advancedly flows through the equivalent body diode of the main switch 211. Thus, the main switch 211 is able to be zero-voltage switched on at the beginning of the seventh working mode. As shown in FIG. 3, when the main switch 211 is switched on in the sixth working mode, the seventh working mode is started.

Figure 10:
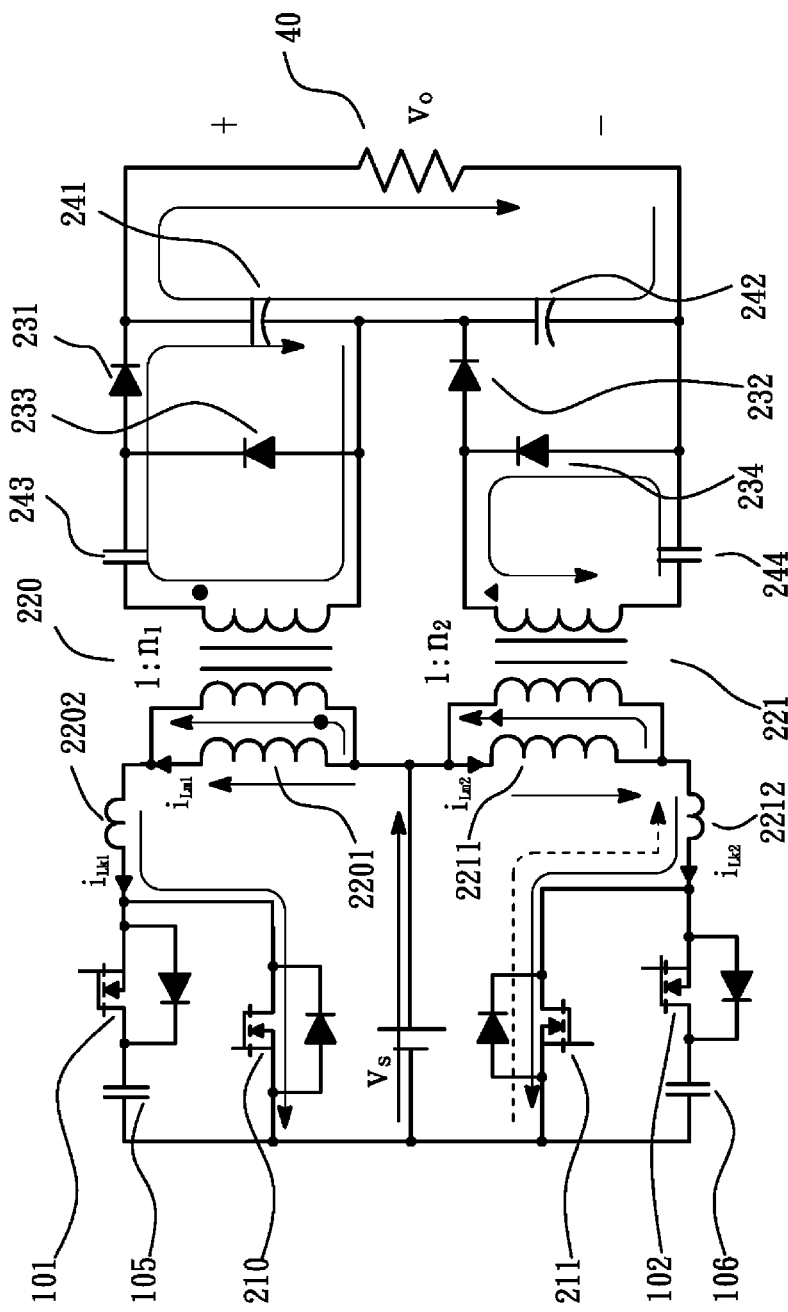
FIG. 10 shows an equivalent circuit in a seventh working mode in accordance with a first embodiment of a direct current converter of the invention.

FIG. 10 shows an equivalent circuit of the direct current converter 30 in the seventh working mode, in which the main switches 210 and 211 are switched on, the active clamp switches 101 and 102 are switched off, the diodes 231 and 234 are switched on, and the diodes 233 and 232 are switched off. As mentioned above, because the current of the main switch 211 already flows through the equivalent body diode of the main switch 211 in the previous working mode (the sixth working mode), the main switch 211 is able to be zero-voltage switched on at the beginning of the seventh working mode. The primary-side current of the isolating transformer 220 flows in the dot, and the secondary-side current of the isolating transformer 220 flows out from the dot for releasing energy from the capacitor 241 and the load 40 when flowing through the diode 231 and the capacitor 243. The primary-side input current of the isolating transformer 221 flows out from the dot, and the secondary-side current of the isolating transformer 221 flows in the dot for storing energy in the capacitor 244 when flowing through the diode 234. The capacitor 242 releases energy from the load 40. With respect to current directions illustrated in FIG. 10, a dashed line represents a current direction when the seventh working mode is started, and a solid line represents a current direction when the seventh working mode is ended. In FIG. 10, it can be appreciated that the current $i_{Lk2}$ flowing through the leakage inductance 2212 is changed from a negative current to a positive current in the seventh working mode. When the current $i_{Lk2}$ flowing through the leakage inductance 2212 is equal to a current $i_{Lm2}$ flowing through the excitation inductance 2211, the primary-side current of the isolating transformers 221 begins to flow in the dot, and the eighth working mode is started.

Figure 11:
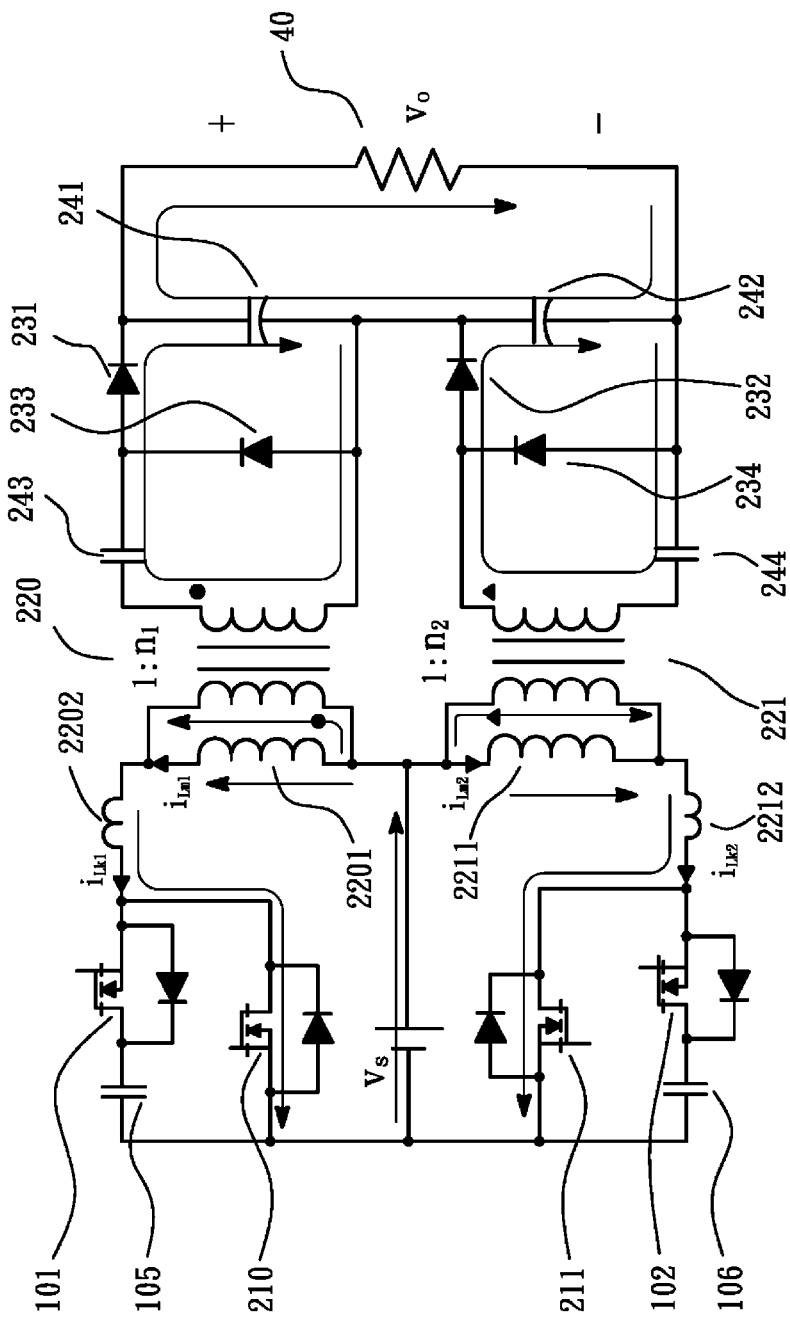
FIG. 11 shows an equivalent circuit in an eighth working mode in accordance with a first embodiment of a direct current converter of the invention.

FIG. 11 shows an equivalent circuit of the direct current converter 30 in the eighth working mode, in which the main switches 210 and 211 are switched on, the active clamp switches 101 and 102 are switched off, the diodes 231 and 232 are switched on, and the diodes 233 and 234 are switched off. The primary-side current of each of the isolating transformers 220 and 221 flows in the dot, and the secondary-side current of each of the isolating transformers 220 and 221 flows out from the dot for releasing energy from the capacitors 241 and 242 and the load 40 when flowing through the diodes 231 and 232 and the capacitors 243 and 244, respectively. As shown in FIG. 3, when the main switch 210 is switched off in the eighth working mode, the ninth working mode is started.

Figure 12:
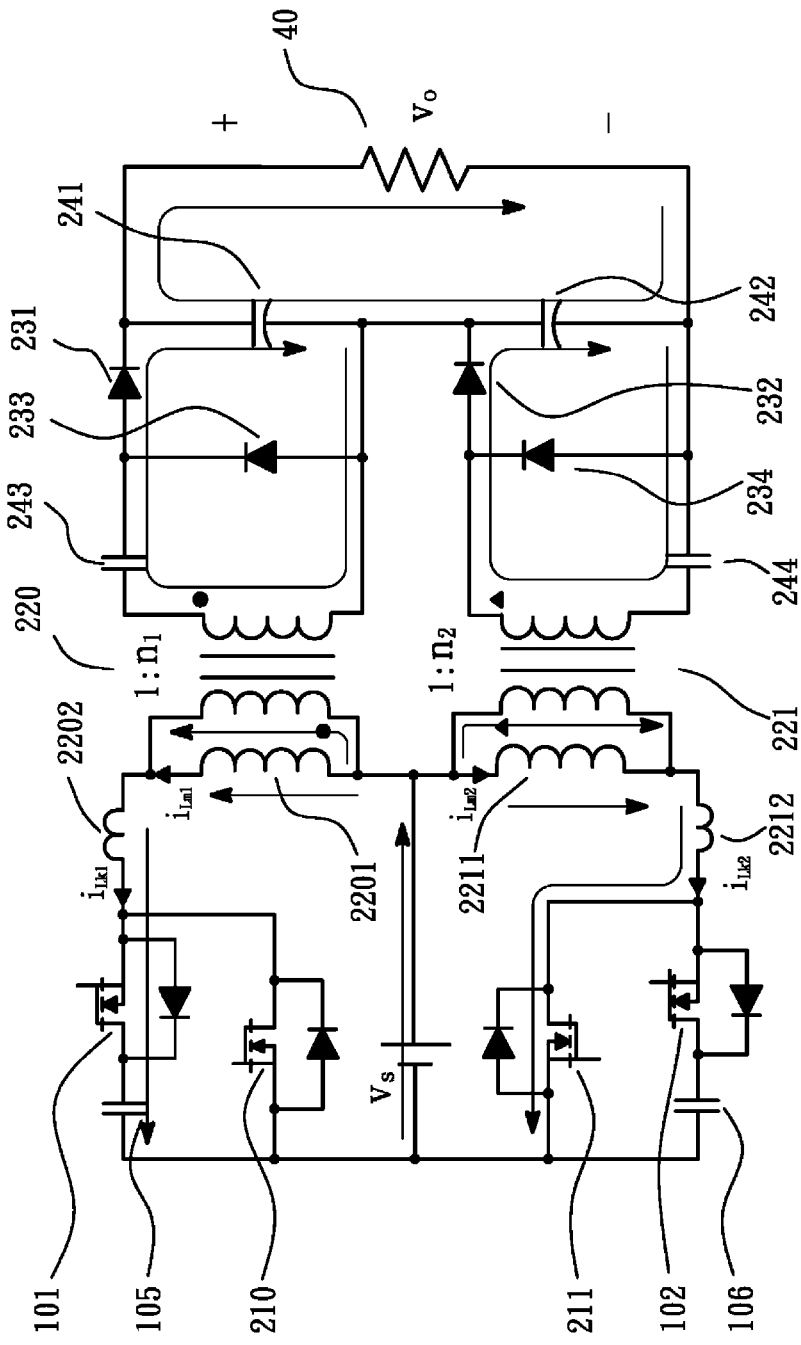
FIG. 12 shows an equivalent circuit in a ninth working mode in accordance with a first embodiment of a direct current converter of the invention.

FIG. 12 shows an equivalent circuit of the direct current converter 30 in the ninth working mode, in which the main switch 211 is switched on, the main switch 210 and the active clamp switches 101 and 102 are switched off, the diodes 231 and 232 are switched on, the diodes 233 and 234 are switched off, and at this moment the switches 210, 211, 101, and 102 are situated at the dead time. The primary-side current of each of the isolating transformers 220 and 221 flows in the dot, and the secondary-side current of each of the isolating transformers 220 and 221 flows out from the dot for releasing energy from the capacitors 241 and 242 and the load 40 when flowing through the diodes 231 and 232 and the capacitors 243 and 244, respectively. Due to the continuous flow of the current $i_{Lk1}$ of the leakage inductance 2202, the equivalent body diode of the active clamp switch 101 is switched on, and the current of the active clamp switch 101 advancedly flows through the equivalent body diode of the active clamp switch 101. Thus, the active clamp switch 101 is able to be zero-voltage switched on at the beginning of the tenth working mode. As shown in FIG. 3, when the active clamp switch 101 is switched on in the ninth working mode, the tenth working mode is started.

Figure 13:
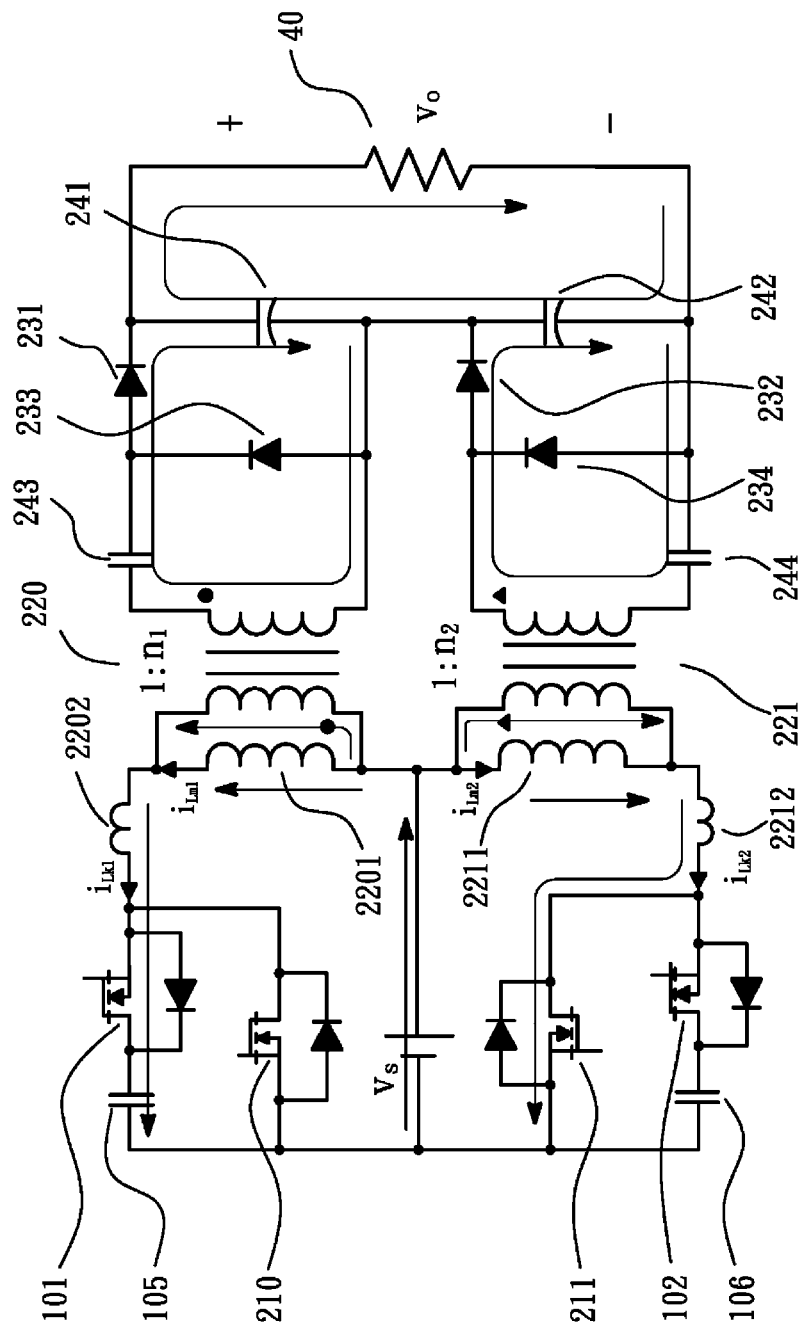
FIG. 13 shows an equivalent circuit in a tenth working mode in accordance with a first embodiment of a direct current converter of the invention.

FIG. 13 shows an equivalent circuit of the direct current converter 30 in the tenth working mode, in which the main switch 211 and the active clamp switch 101 are switched on, the main switch 210 and the active clamp switch 102 are switched off, the diodes 231 and 232 are switched on, and the diodes 233 and 234 are switched off. As mentioned above, because the equivalent body diode of the active clamp switch 101 is already switched on in the previous working mode (the ninth working mode), the active clamp switch 101 is able to be zero-voltage switched on at the beginning of the tenth working mode. The primary-side current of each of the isolating transformers 220 and 221 flows in the dot, and the secondary-side current of each of the isolating transformers 220 and 221 flows out from the dot for releasing energy from the capacitors 241 and 242 and the load 40 when flowing through the diodes 231 and 233 and the capacitors 243 and 244, respectively. When the current $i_{Lk1}$ flowing through the leakage inductance 2202 is equal to a current $i_{Lm1}$ flowing through the excitation inductance 2201 in the tenth working mode, the primary-side current of the isolating transformers 220 begins to flow out from the dot, and the eleventh working mode is started.

Figure 14:
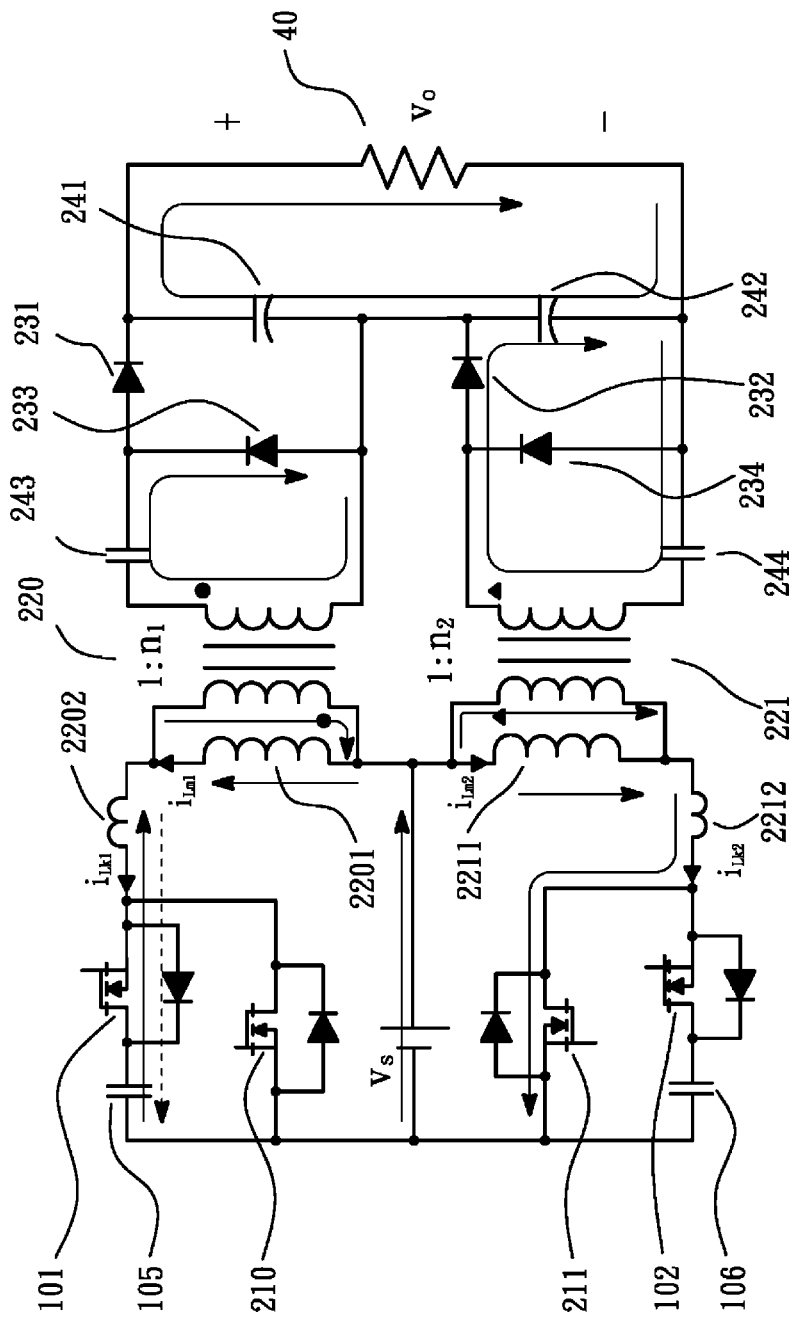
FIG. 14 shows an equivalent circuit in an eleventh working mode in accordance with a first embodiment of a direct current converter of the invention.

FIG. 14 shows an equivalent circuit of the direct current converter 30 in the eleventh working mode, in which the main switch 211 and the active clamp switch 101 are switched on, the main switch 210 and the active clamp switch 102 are switched off, the diodes 233 and 232 are switched on, and the diodes 231 and 234 are switched off. The primary-side current of the isolating transformer 220 flows out from the dot, and the secondary-side current of the isolating transformer 220 flows in the dot for storing energy in the capacitor 243 when flowing through the diode 233. The capacitor 241 releases energy from the load 40. The primary-side current of the isolating transformer 221 flows in the dot, and the secondary-side current of the isolating transformer 221 flows out from the dot for releasing energy from the capacitor 242 and the load 40 when flowing through the diode 232 and the capacitor 244. With respect to current directions illustrated in FIG. 14, a dashed line represents a current direction when the eleventh working mode is started, and a solid line represents a current direction when the eleventh working mode is ended. In FIG. 14, it can be appreciated that the current $i_{Lk1}$ flowing through the leakage inductance 2202 is changed from a positive current to a negative current in the eleventh working mode. As shown in FIG. 3, when the active clamp switch 102 is switched off in the eleventh working mode, the twelfth working mode is started.

Figure 15:
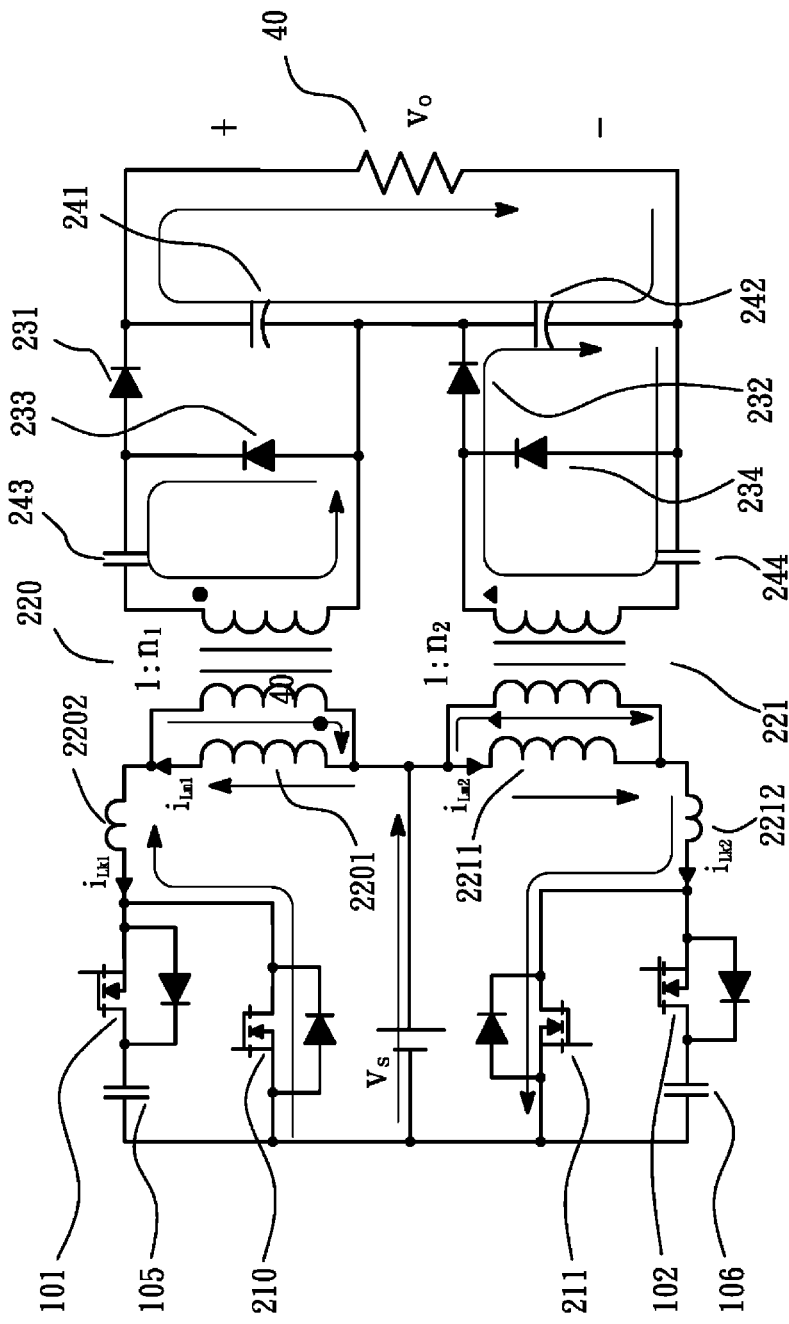
FIG. 15 shows an equivalent circuit in a twelfth working mode in accordance with a first embodiment of a direct current converter of the invention.
Figure 16:
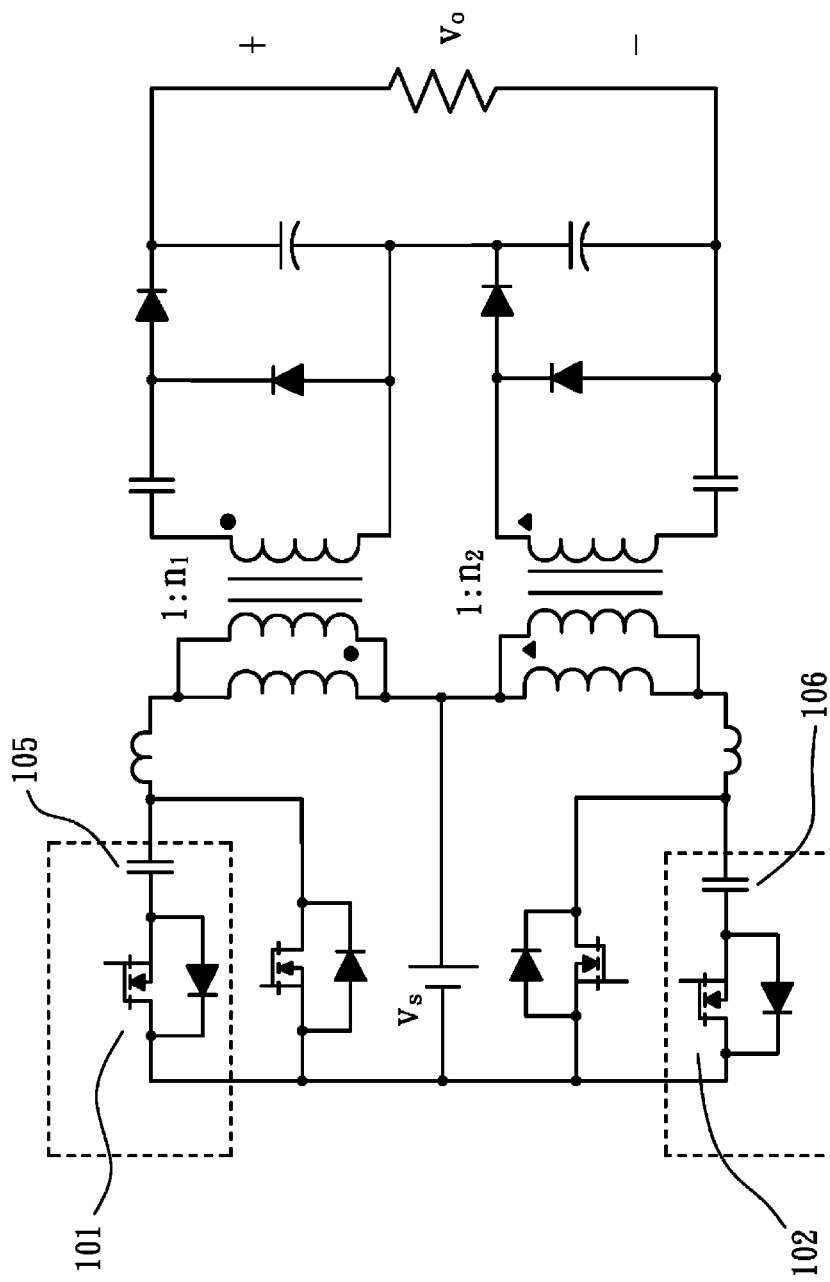
FIG. 16 is a circuit diagram of a second embodiment of a high-efficiency high step-up ratio direct current converter with an interleaved soft-switching mechanism of the invention.

FIG. 15 shows an equivalent circuit of the direct current converter 30 in the twelfth working mode, in which the main switch 211 is switched on, the main switch 210 and the active clamp switches 101 and 102 are switched off, the diodes 233 and 232 are switched on, the diodes 231 and 234 are switched off, and at this moment the switches 210, 211, 101, and 102 are situated at the dead time. The primary-side current of the isolating transformer 220 flows out from the dot, and the secondary-side current of the isolating transformer 220 flows in the dot for storing energy in the capacitor 243 when flowing through the diode 233. The capacitor 241 releases energy from the load 40. The primary-side current of the isolating transformer 221 flows in the dot, and the secondary-side current of the isolating transformer 221 flows out from the dot for releasing energy from the capacitor 242 and the load 40 when flowing through the diode 232 and the capacitor 244. Due to the continuous flow of the current $i_{Lk1}$ of the leakage inductance 2202, the equivalent body diode of the main switch 210 is switched on, and the current of the main switch 210 advancedly flows through the equivalent body diode of the main switch 210. Thus, the main switch 210 is able to be zero-voltage switched on at the beginning of the first working mode. As shown in FIG. 3, when the main switch 210 is switched on in the twelfth working mode, the operation is returned to the first working mode to regularly perform the above-described modes.

By mathematical model derivation and simulation verification, an ideal step-up ratio of the direct current converter can be obtained as follows (when ratio of winding of each of the isolating transformers $T_1$ and $T_2$ is n)(n1=n2=n).

$$\frac{V_o}{V_s} = \frac{2n}{1-D}$$

where $V_o$ represents the output voltage, $V_s$ represents the input voltage, and D represents the duty cycle of the main switches 210 and 211.

Figure 17:
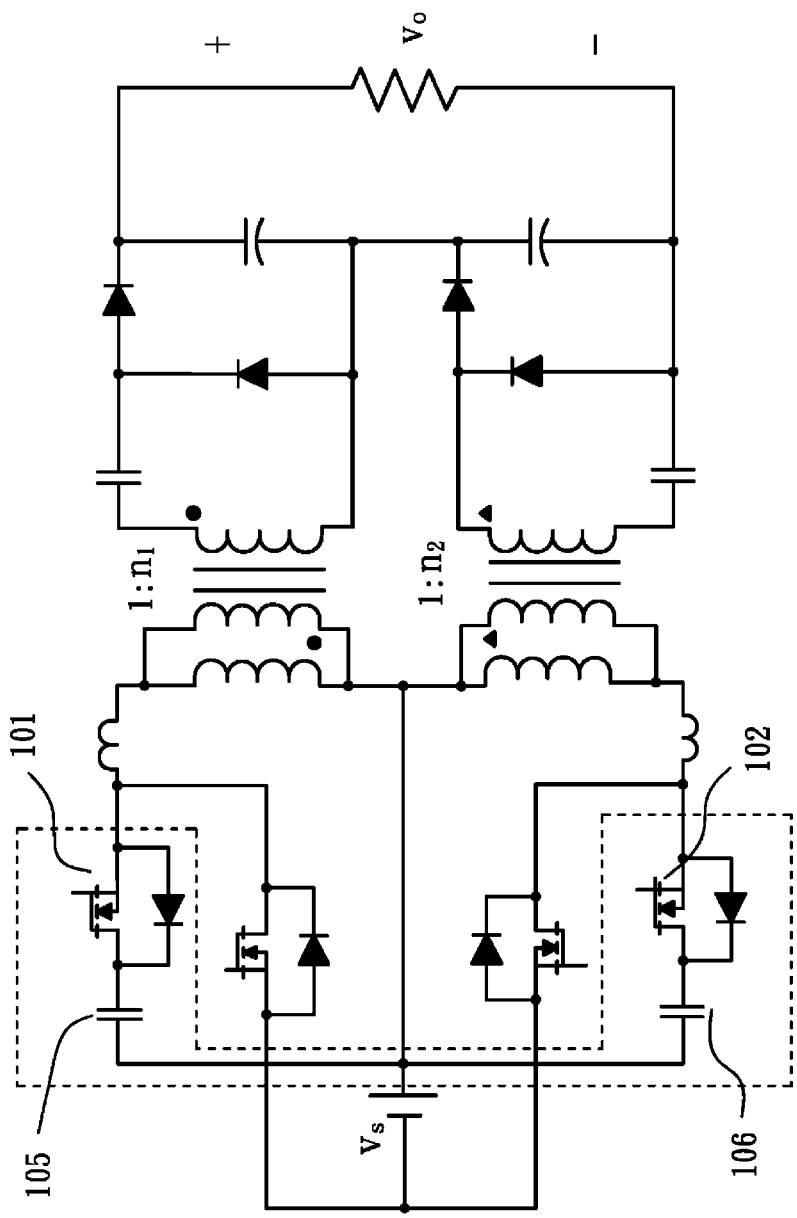
FIG. 17 is a circuit diagram of a third embodiment of a high-efficiency high step-up ratio direct current converter with an interleaved soft-switching mechanism of the invention.
Figure 18:
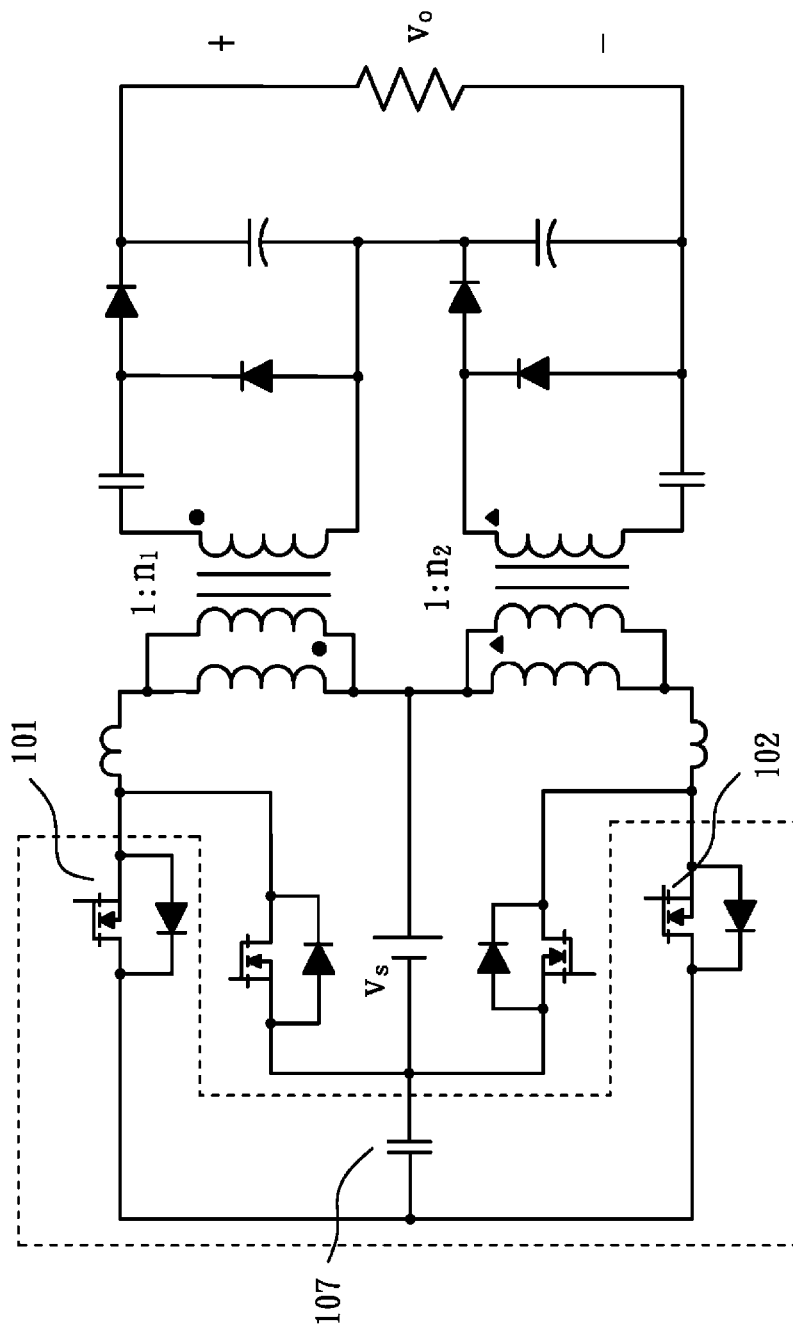
FIG. 18 is a circuit diagram of a fourth embodiment of a high-efficiency high step-up ratio direct current converter with an interleaved soft-switching mechanism of the invention.
Figure 19:
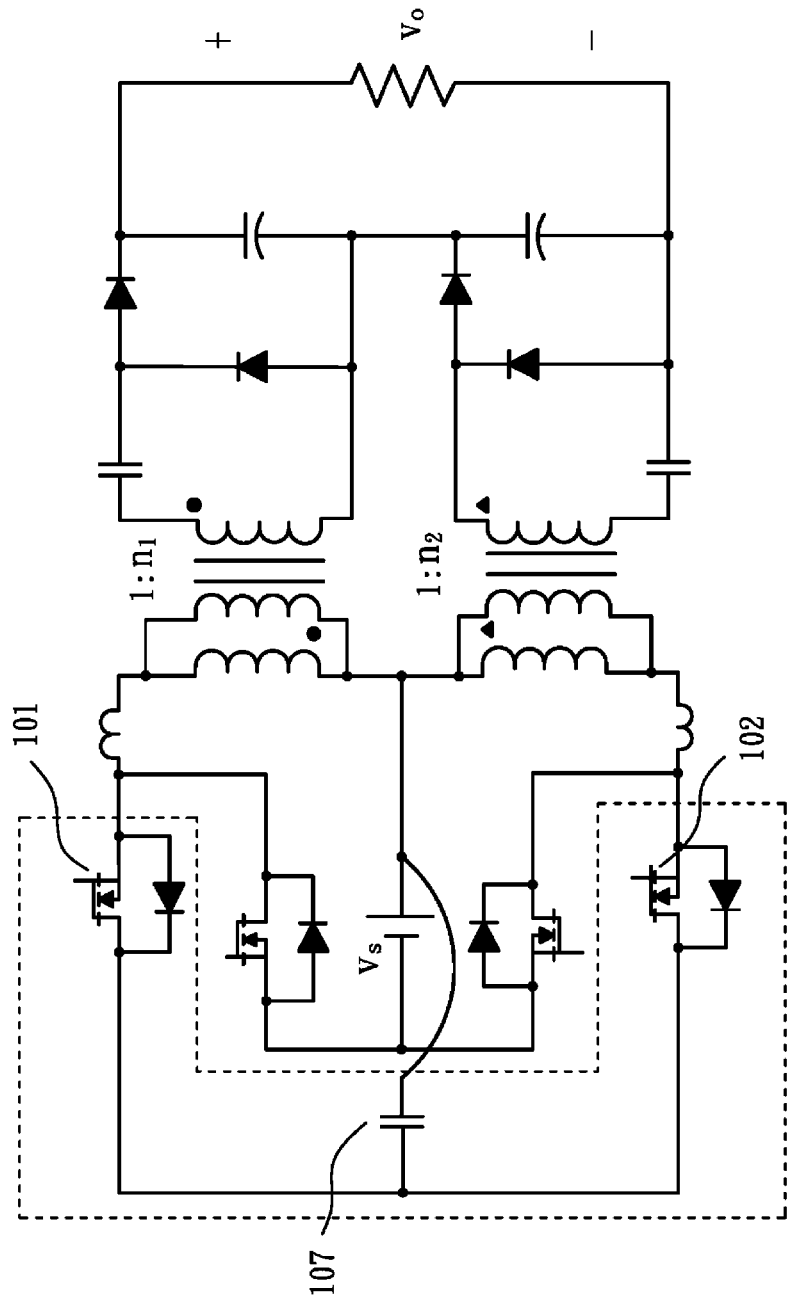
FIG. 19 is a circuit diagram of a fifth embodiment of a high-efficiency high step-up ratio direct current converter with an interleaved soft-switching mechanism of the invention.

The invention can develop other embodiments of the circuit structure in accordance with placement and adaption of different active clamping circuits. Referring to FIGS. 16, 17, 18 and 19, FIG. 16 represents a circuit diagram of a second embodiment of a direct current converter of the invention, FIG. 17 represents a circuit diagram of a third embodiment of a direct current converter of the invention, FIG. 18 represents a circuit diagram of a fourth embodiment of a direct current converter of the invention, and FIG. 19 represents a circuit diagram of a fifth embodiment of a direct current converter of the invention. The second, third, fourth and fifth embodiments differ from the first embodiment in that the second, third, fourth and fifth embodiments provide different arrangements of the active clamp switches 101 and 102 and the clamp capacitors 105 and 106, respectively. Moreover, only one clamp capacitor 107, which is a combination of the two clamp capacitors 105 and 106 of the first embodiment, is provided in the fourth and fifth embodiments, and the clamp capacitor 107 has similar operation principle and efficacy and same step-up ratio to the clamp capacitors 105 and 106 of the first embodiment. Thus, the related description of the clamp capacitor 107 is omitted.

The invention provides advantages as follows.

Firstly, the direct current converter of the invention is provided with a circuit protection by electrically isolating the low-voltage side from the high-voltage side.

Secondly, with respect to increment of conversion efficiency, the input low-voltage side switches cooperated with an active clamp technique are capable of attaining a zero-voltage soft-switching operation and reducing the switching losses. Accordingly, the direct current converter of the invention is provided with a property of high conversion efficiency.

Thirdly, with the direct current converter of the invention cooperated with the active clamp technique, the working range of the switch of the converter is not limited. Further, with the circuit of the invention provided with an inherently extreme high step-up ratio, it is advantageous to voltage boosting of a solar energy battery module (e.g., in parallel operation with the utility) required by a post-stage converter. Accordingly, the direct current converter of the invention is particularly suitable for a medium-small solar photovoltaic module with large voltage fluctuation range.

Fourthly, the direct current converter of the invention is capable of being modulized and operated without additional inductance, thereby reducing costs and increasing productivity.

The direct current converter of the invention is capable of applying on a renewable energy system (e.g., solar photovoltaic generation system). However, it is to be understood that the application of the invention is not limited thereto, and the invention is suitable for a system which is required of boosting the voltage of a DC power.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A high-efficiency high step-up ratio direct current converter with an interleaved soft-switching mechanism, comprising:
    a voltage-multiplier circuit comprising two isolating transformers, two main switches disposed on a primary side of the two isolating transformers, four diodes disposed on a secondary side of the two isolating transformers and four capacitors disposed on the secondary side of the two isolating transformers, configured to boost a voltage of a direct-current power to a desired voltage value; and
    an active clamping circuit, electrically connected to the voltage-multiplier circuit, comprising two active clamp switches and a clamp capacitor to lower a voltage surge of the two main switches so that the two main switches and the two active clamp switches can be soft switched on;
    wherein a step-up ratio of the direct current converter satisfies:

$$\frac{V_o}{V_s} = \frac{2n}{1-D}$$

where $V_o$ is an output voltage of the direct current converter, $V_s$ is an input voltage of the direct current converter, n is a ratio of winding of each of the two isolating transformers, and D is a duty cycle of each of the two main switches.

2. The high-efficiency high step-up ratio direct current converter with the interleaved soft-switching mechanism as claimed in claim 1, wherein the two main switches are configured to be in interleaved switching operation, the two active clamp switches are configured to be in interleaved switching operation, and the two main switches and the two active clamp switches are configured to be in complementary switching operation.

3. The high-efficiency high step-up ratio direct current converter with the interleaved soft-switching mechanism as claimed in claim 2, wherein the two main switches and the two active clamp switches are soft switched with dead time provided therebetween.

* * * * *